May 21, 1957  B. A. DUNELL ET AL  2,793,186
APPARATUS FOR CLASSIFYING OR SETTLING FLUID SUSPENSIONS
Filed Jan. 8, 1954
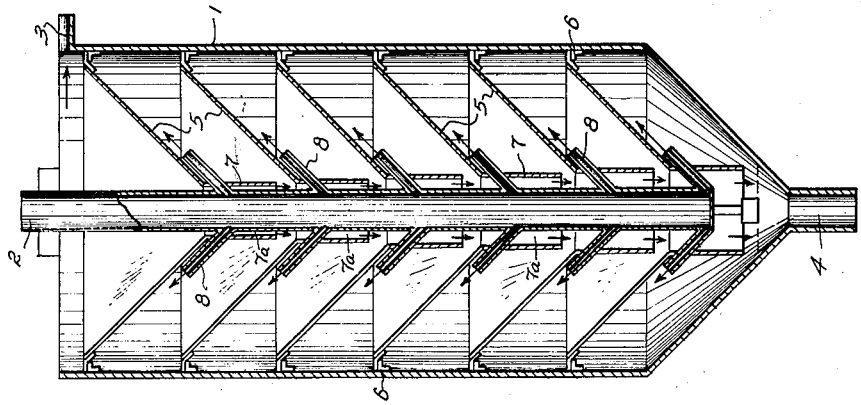
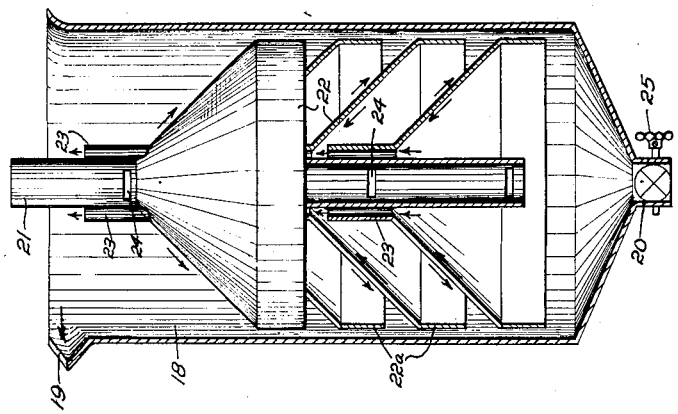
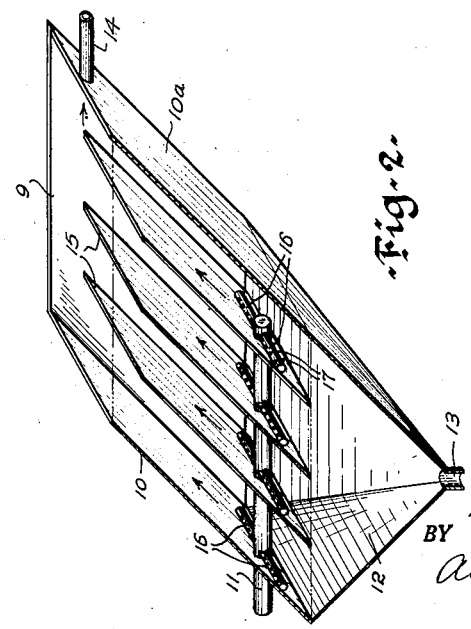
INVENTOR.
Basil A. Dunell, Alan E. J.
Eggleton and Ira E. Puddington
BY
Alex. E. MacRae
Attorney.

United States Patent Office 2,793,186
Patented May 21, 1957

2,793,186

APPARATUS FOR CLASSIFYING OR SETTLING FLUID SUSPENSIONS

Basil Anderson Dunell, Vancouver, British Columbia, Canada, Alan Edwin John Eggleton, Didcot, England, and Ira Edwin Puddington, Ottawa, Ontario, Canada, assignors to National Research Council, Ottawa, Ontario, Canada, a body corporate of Canada Application January 8, 1954, Serial No. 402,916

1 Claim. (Cl. 210—521)

This invention relates to dewatering and sedimentation and more particularly to improved apparatus for effectively and rapidly removing solid particles or fluid from fluid suspensions.

When a finely divided solid settles in a fluid medium, the rate of fall of individual particles in a vertical direction is governed by Stoke's law. If the suspension container is arranged in a vertical position, the rate of fall continues until mutual interference of the particles causes a reduction in the rate. This usually occurs before the equilibrium sedimentation volume is reached. If, however, the container is set at an angle, the vertical fall of the particles produces an overall density gradient across the container and since the suspension is more dense on one side than the other, the sediment will settle as a whole while the liquid on the less dense side will rise, thus causing a convection or carrying current. Although sloping baffles have been used heretofore for separating or settling a fluid suspension, there is no indication that the principle set forth above has been heretofore recognized or applied.

Any fluid suspension wherein the components differ in density, produces, when settling or creaming in a tilted container, a convection current due to a fluid density gradient at right angles to the axis of the container caused by the settling of the discontinuous phase in a vertical direction. This convection current causes a pronounced increase in the rate of vertical sedimentation and thus in the rate of separation of the components of the suspension. The intensity of its effect is influenced by concentration of solids in the suspension, angle of tilt of the operating parts of the device, the viscosity of the continuous phase and the density differential between the components.

Since the effect of the convection current is to increase the rate of sedimentation, anything which interferes with it reduces the rate of separation of the components of the suspension or the through-put of the device being used. It is thus essential, if the device is to be used in a continuous manner, that the feeding and discharge of the device must be done so as to interfere as little as possible with the convection current in carrying out the principle set forth above.

The object of this invention is to provide apparatus which effectively takes full advantage of the principles just described in sedimentation or dewatering.

The invention is now described in relation to the accompanying drawing in which are illustrated three forms of apparatus embodying the feed and discharge arrangement necessary to take advantage of the convection currents as they affect gravity separation.

Figure 1 is a sectional elevation of one form of the apparatus.

Figure 2 is a similar view of another form and arrangement of parts, and

Figure 3 is a similar view of a still further arrangement.

Referring to Figure 1 of the drawing, 1 is a cylindrical container or vessel providing a sedimentation or dewatering chamber, 2 is a tube or conduit axially arranged in the vessel and providing a suspension feed inlet, 3 is a fluid discharge outlet located adjacent the top of the vessel, and 4 an axially arranged discharge outlet for solid particles in the bottom wall of the vessel.

A plurality of inverted conical baffles 5 are mounted in the vessel in vertically spaced relation. The upper edge of each baffle is in spaced relation to the side wall of the vessel and the baffle is suspended therefrom by means of a plurality of spaced brackets 6. The lower portion of each baffle terminates in a tube 7 which skirts the tube 2 in spaced relation thereto to provide annular passages 7a leading from the compartment provided by each baffle to the next. Preferably, the diameters of the tubes 7 progressively increase from the top to the bottom of the vessel.

The baffles 5 are arranged at an angle of not less than approximately 40 nor more than approximately 60°, and in the preferred embodiment at an angle of approximately 45°, from the horizontal whereby each compartment between the baffles is inclined and means are provided to direct the suspension or parts of it into the natural convection current in each compartment. Such means comprises a plurality of pipes 8 leading from tube 2 immediately below the base of each baffle. The pipes 8 are inclined in substantially the same direction as that of the baffle and deliver the suspension closely adjacent the underside of each baffle, i. e., into the convection current adjacent the underside of the baffle. It will be apparent that the number of baffles and successive compartments provided thereby may be varied to suit the requirements of each case.

Referring to Figure 2, 9 is a rectangular vessel providing a sedimentation and dewatering chamber having inclined side walls 10 and 10a. A suspension feed tube 11 extends transversely through the chamber adjacent the bottom thereof. The chamber has a solids collecting portion 12 adjacent the bottom thereof and a solids discharge outlet 13. A clear fluid outlet 14 is provided adjacent the top of the chamber. A plurality of spaced inclined rectangular baffles 15, arranged in planes substantially parallel to the side walls 10 and 10a, are mounted on tube 11 within the vessel, thus providing a plurality of inclined compartments in the chamber. The tube 11 is provided with a pair of branches 16 extending laterally outwardly therefrom adjacent the base of a side wall 10 and of each baffle on the underside thereof. Each branch 16 has a plurality of upwardly directed outlets 17 disposed closely adjacent the underside of the respective baffle.

The suspension is fed into tube 11 which discharges it through outlets 17 at the base of the underside of the side wall 10 and baffles 15 which form the inclined compartments in each of which an upward clear fluid flow in the direction of the natural convection current can take place, while the solids settle downwardly. The currents of clear fluid provide an upper body of clear fluid which flows outwardly through outlet 14. The solids are withdrawn through outlet 13.

Referring to Figure 3, a cylindrical vessel 18 provides the sedimentation or dewatering chamber having a top fluid discharge lip 19 and a bottom axial solids discharge outlet 20. A tube 21, axially arranged in the vessel provides the suspension feed inlet.

A plurality of conical baffles 22 are mounted in the vessel in vertically spaced relation and providing a plurality of compartments therebetween, the apexes of the baffles being arranged in uppermost position in distinction to the baffles 5 in Figure 1. The lower or outer edge of each baffle is in spaced relation to the wall of the vessel and may be provided with a cylindrical skirt 22a. The upper edge of each baffle is fixed to the tube 21 and a plurality of spaced pipes 23 lead from the interior of each baffle adjacent its apex upwardly along the tube 21. In each of the baffles, below the uppermost, the upper ends of pipes 23 are located closely adjacent the underside of the adjacent baffle. The tube 21 is provided with a plurality of suspension discharge parts 24 slightly above the apex of each baffle. The suspension is fed into tube 21 from whence it is discharged through ports 24 onto the upper inclined surfaces of each baffle. The undersides of the baffles provide upward flow of clear fluid, such clear fluid flowing upwardly through pipes 23 for eventual discharge over lip 19. The solids collect in the bottom portion of the vessel for controlled discharge through outlet 20 as by means of a valve 25.

It will be understood that the angle of inclination of baffles 15 and 22 is within the range specified with respect to baffles 5 of Figure 1.

It will be observed that in operation the fluid suspension, carrying its load of suspended solid particles at the particular point of feed into the chamber, is discharged into the convection current and the provision of the inclined compartments described takes full benefit of the natural conditions existing in fluid suspensions in gravity separation.

The effect of the angle at which the separation compartment is inclined may be illustrated by the following table, where the amount of sedimentation in a 2% potato starch suspension in water, is indicated per unit of time.

| Angle of Compartment | Slant Height of Clear Fluid | Vertical Height of Clear Fluid | Theoretical Slant Height |
|---|---|---|---|
| 90 | 17 | 17 | 17 |
| 60 | 45 | 39 | 20 |
| 45 | 60 | 42 | 24 |
| 30 | 70 | 35 | 34 |

Were the separation effect due to the shorter vertical fall caused by the angle of tilt all the figures in column 3 should be 17 and those in column 4 should correspond to those in column 2. The departure is due to the increased rate of sedimentation or dewatering produced by the density gradient across the container at right angles to its long axis. As indicated, the preferred angle of the separation compartment is 45° from the horizontal, but for continuous operation an angle of not more than 60° nor less than 40° may be employed.

In practical operation the following examples illustrate the beneficial effect of the invention:

1. A 2% aqueous suspension of potato starch was treated in a static experimental tank about 14″ long, 6″ wide, and 8″ deep, having perpendicular sides and rectangular baffles at 45° angles, as shown in Figure 2, and in the same type of chamber without the baffles. In the former, the rate of vertical setling or separation was at least twice as great as that in the latter.

2. When the same suspension was treated in the device illustrated in Figure 3, with continuous feed of the suspension and discharge of the water and solids, the through-put capacity of the container was increased by about six times over the through-put rate when the baffles were removed and the suspension fed into the bottom of the container.

3. The clarification of liquid suspensions in the production of vanillin in continuous centrifuges and thickeners gives rise to considerable difficulty in practice. The rate of separation is increased four times, over the normal vertical settling, by use of the present method.

4. A suspension of hydrated iron oxide in a salt solution containing polyvalent ions settled at the rate of 2.25 inches per unit of time in a vertically disposed compartment and 7.25 inches in a tilted compartment as herein described.

We claim:

Apparatus for classifying liquid suspensions which comprises a container having opposed parallel side walls disposed at an angle of approximately 40° to 60° from the horizontal, and discharge outlets adjacent its top and bottom, a plurality of spaced baffles within said container and disposed substantially parallel to said side walls, said side walls and baffles forming a plurality of angularly disposed compartments within said container, and a feed conduit extending into and across said container adjacent the lower edges of said baffles, said feed conduit having branches extending along the lower edge of one of said side walls and of each of said baffles, each said branch having ports located directly beneath and directed onto the lower portion of the underside of said one side wall and said baffles.

References Cited in the file of this patent

UNITED STATES PATENTS

| 731,346 | Delmouly | June 16, 1903 |
| 1,648,607 | Brown | Nov. 8, 1927 |
| 1,709,971 | Coe | Apr. 23, 1929 |
| 1,825,550 | Schulte | Sept. 29, 1931 |

FOREIGN PATENTS

| 16,743 | Great Britain | 1884 |
| 308,752 | Great Britain | Aug. 22, 1929 |